United States Patent [19]

Nee et al.

[11] Patent Number: 4,885,961
[45] Date of Patent: Dec. 12, 1989

[54] REPLACEMENT OF SPLIT-PIN ASSEMBLIES IN NUCLEAR REACTOR

[75] Inventors: John D. Nee, Levelgreen, Pa.; Richard A. Green, Farmington Hills, Mich.

[73] Assignee: Westinghouse Electric Corp., Pittsburgh, Pa.

[21] Appl. No.: 927,569

[22] Filed: Nov. 6, 1986

Related U.S. Application Data

[62] Division of Ser. No. 617,853, Jun. 6, 1984, abandoned.

[51] Int. Cl.$^4$ .............................................. B25B 21/00
[52] U.S. Cl. ........................................ 81/55; 81/57.24
[58] Field of Search ...................................... 81/54–56, 81/57.24

[56] References Cited

U.S. PATENT DOCUMENTS

| | | | |
|---|---|---|---|
| 2,639,894 | 5/1953 | Smith | 81/56 X |
| 3,218,893 | 11/1965 | Madison et al. | 81/55 |
| 3,277,749 | 10/1966 | Osburn et al. | 81/56 X |
| 3,323,394 | 6/1967 | Bangerter et al. | 81/55 X |
| 3,485,118 | 12/1969 | Maughan, Jr. | 81/55 X |

Primary Examiner—James G. Smith

[57] ABSTRACT

A pin-insertion/torque tool has a blade in a loading tube, which blade is vertically moveable axially by a hydraulic cylinder and can rotate for proper pin alignment. The tool includes a laterally open wrench having splines capable of engaging splines on the new nut. The new split pin is mounted on the blade by a long tube in the end of which the pin is threaded. Once on the blade the tube is unthreaded from the pin. The pin-insertion/torque tool is then moved to a position precisely set by a stop centered along the axis of the hole joining the counterbores in the LGT. The blade is raised thus inserting the new split pin through the lower counterbore and through hole and into the new nut which was deposited in the upper counterbore of the LGT by a pick-and-put tool. The wrench is then repeatedly engaged with the splines in the nut laterally of the "mousehole" into which the nut extends and is rotated, by a hydraulic cylinder and a rack and pinion, over a limited angle. The mechanism which rotates the wrench resets the wrench precisely at the same point in space at the beginning of each stroke. There is clearance between the railing edge of the wrench and the "mousehole" at the beginning of each stroke and between the leading edge of the wrench and the "mousehole" at end of each stroke. A hold-down arm for the new nut is provided. The rotation of the nut threads the nut onto the split pin and draws the split pin into the lower counterbore. Low torque is applied until the nut is stalled on the base of the upper counterbore and then high torque of precise magnitude is applied to secure the nut.

15 Claims, 10 Drawing Sheets

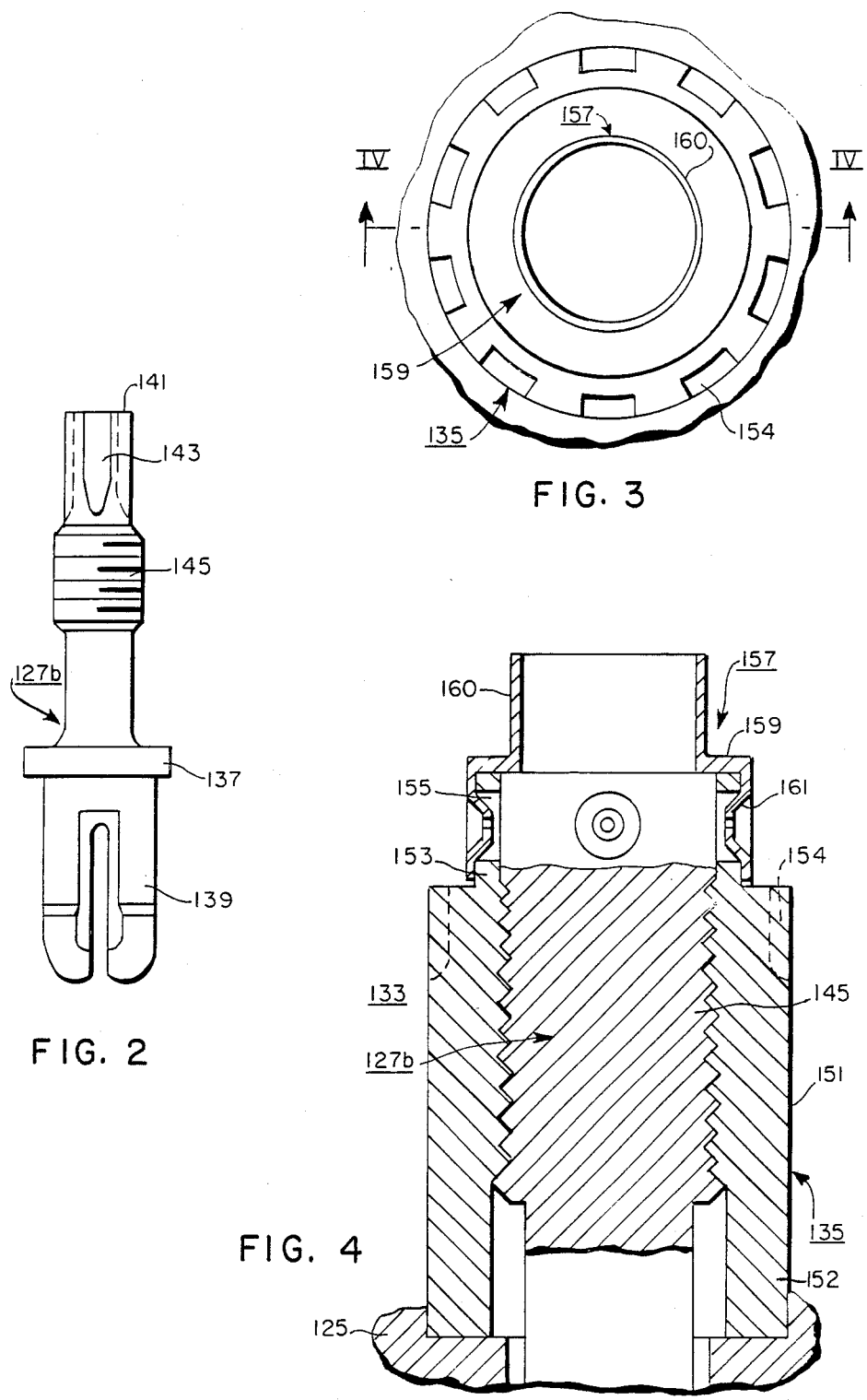

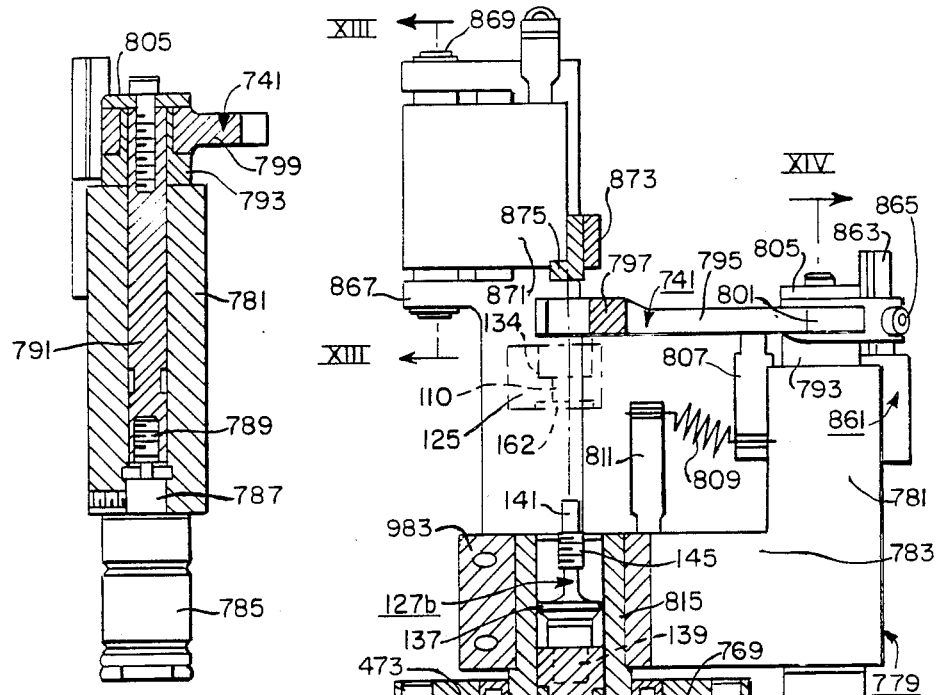
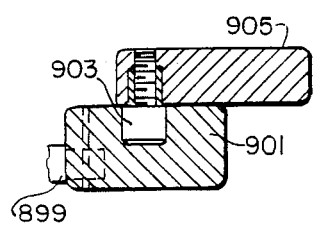
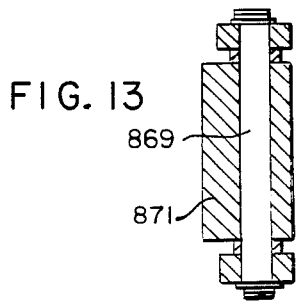
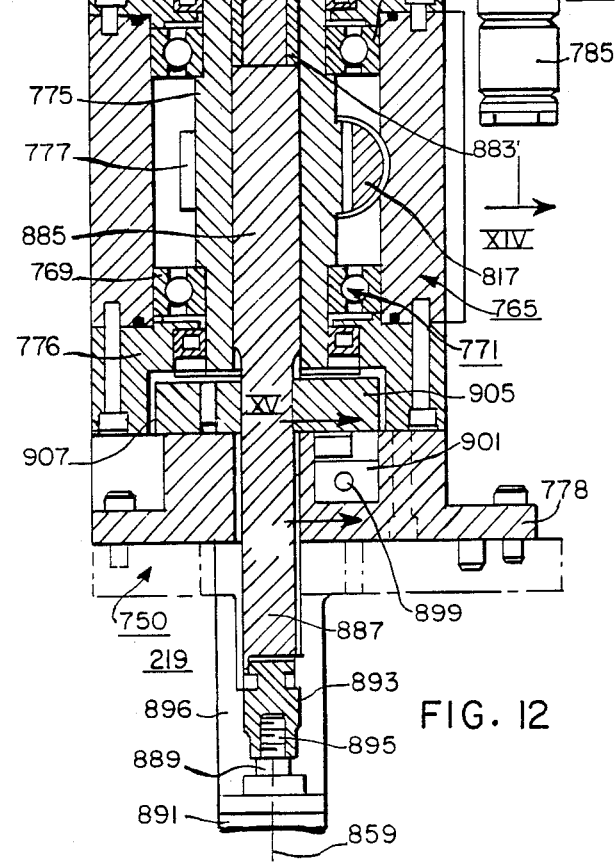

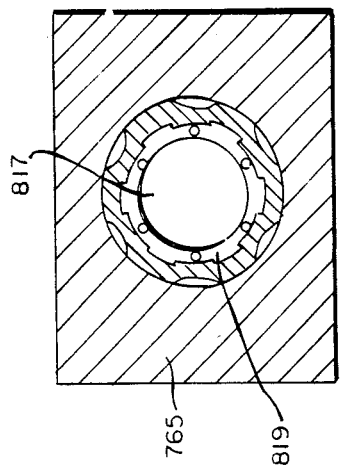
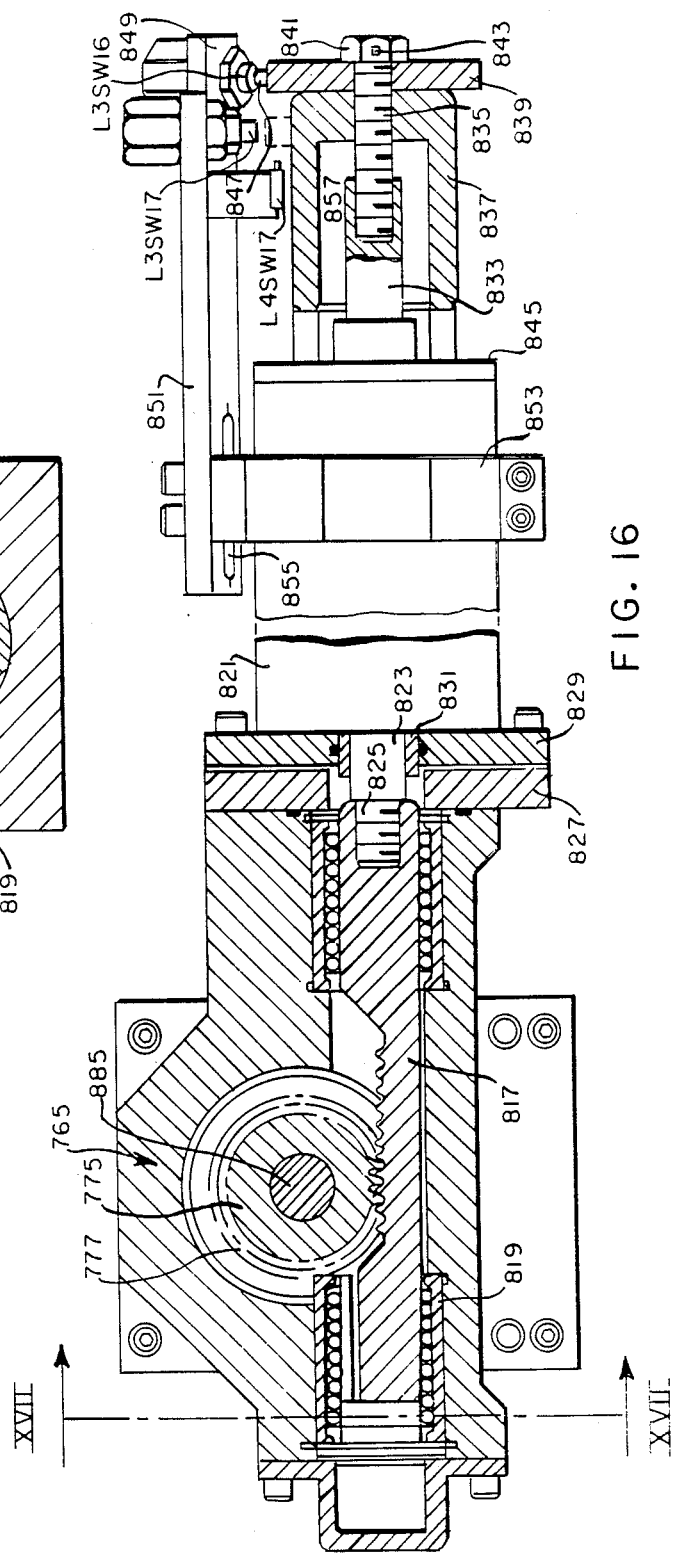

REPLACEMENT OF SPLIT-PIN ASSEMBLIES IN NUCLEAR REACTOR

This is a division of application Ser. No. 06/617,854 filed June 6, 1984.

REFERENCE TO RELATED APPLICATION

This application is a division of U.S. Pat. No. 4,730,388 granted Mar. 15, 1988 to applicants for "Replacement of Split Pin Assemblies in Nuclear Reactor" and assigned to Westinghouse Electric Corporation. Application Ser. No. 576,645 filed Feb. 3, 1984 to John T. Land, Ronald J. Hopkins and Jose M. Martinez for "Replacement Support Pin for Guide Tubes for Operating Plants" now U.S. Pat. No. 4,770,846 granted Sept. 13, 1988 and assigned to Westinghouse Electric Corporation is incorporated herein by reference (herein "Land").

Application Ser. No. 617,857 filed concurrently herewith to Raymond F. Calfo, George F. Dailey and Raymond P. Castner for REPLACEMENT OF SPLIT PINS IN GUIDE TUBES, now U.S. Pat. No. 4,720,888 granted Jan. 26, 1988 (herein Calfo), assigned to Westinghouse Electric Corporation, is incorporated herein by reference.

BACKGROUND OF THE INVENTION

This invention relates to nuclear reactors and has particular relationship to the replacement of old split-pin assemblies of a guide tube of a nuclear reactor with new split-pin assemblies. According to the teachings of Calfo the old split-pin assembly, secured in the upper and lower counterbores of the lower circular flange of the lower guide tube (LGT) of the reactor, is processed in a pool of borated water in a work station which includes a plurality of robotic tools. Each guide tube is equipped with two split-pin assemblies located in the lower flange 180° apart. The LGT is precisely positioned by a clamp-and-index tool. The old split-pin assembly is then severed by a metal-disintegration machine tool predominantly into two fragments; one fragment (herein referred to as the "nut fragment") consists of the residual part of the old nut and part of the old split pin threaded to it, and the other consists of the residual part of the split pin. The latter is extracted from the lower counterbore of the flange and deposited in a trash chute by a pin puller and expeller on the clamp-and-index tool. At this point it becomes necessary to remove the nut fragment from the upper counterbore of the flange and then to secure the new split-pin assembly in this flange. A difficulty which is imposed in carrying out this phase of the replacement is that the new nut is only partially accessible for mechanical processing. The nut extends from the upper counterbore into a slot in a wall of the LGT which has the shape of, and is referred to as, a "mousehole". Only a limited area external to the "mousehole" is accessible for removal of the nut fragment and for insertion in the upper counterbore of a new nut and threading it to a new pin. In addition, the tines (or leaves) of the pins must be properly aligned with respect to the top flange of the guide tube. This invention concerns itself with the phase of the overall replacement operation involving the securing of new split-pin assemblies.

It is an object of this invention to provide apparatus for securing the new split-pin assemblies in the flange without damage to the LGT after removal of the nut fragments from the upper counterbore of the flange, and, after the upper and lower counterbores have been cleaned.

The insertion of a new pin includes the proper alignment of the tines and proper torquing of the nuts to the pin.

The replacement is carried out in two stages. In the first stage the nut fragment is removed from the upper counterbore and is replaced by a new nut. This phase and the apparatus for carrying it out is described in parent U.S. Pat. No. 4,730,388. In the second stage to which the instant application is directed the new split-pin assembly is secured to the flange by threading and properly torquing a new nut onto a new split pin. The tooling and practice for this stage must meet the following conditions:

1. It must be capable of orienting the split pins in an LGT properly with respect to the top flange of the lower guide tube.
2. It must be capable of operation in the limited space external to the "mousehole".
3. It must be capable of operation in the space confines imposed by, and in cooperation with, the other tools at the robotic work station.
4. There must be accessibility for the supply of new split-pins from the deck above the pool.
5. The tooling and practice must be capable of automatic operation when coupled to a computer.
6. It must be capable of operating under borated water.
7. It must be capable of applying the proper torque to the nut.

It is an object of this invention to provide tooling which shall meet the above conditions for installing new splitpin assemblies in the lower flange of a LGT of a reactor without damage to the LGT.

SUMMARY OF THE INVENTION

The new nut is positioned in the upper counterbore of the flange of the LGT as disclosed in the parent U.S. Pat. NO. 4,730,388. Once the new nut is positioned in the upper counterbore, the replacement of the sold split-pin assembly by the new split-pin assembly is completed by a pin-insertion/torque tool in accordance with this invention. This tool includes a blade for receiving and aligning new split pins, and a wrench for threading the new nut onto the new pin. The tool also includes a hydraulic cylinder for moving the tool from the "home" or storage position to an operating nut-torquing position. The outer surface of the new nut is splined over a portion of its length. Typically the nut has 10 uniformly-spaced splines; i.e., 36° per spline. The wrench typically has 5 splines. With the tool in the home position a new pin is deposited through a locating funnel on the blade with its tines straddling the blade. To achieve this purpose, the pin is threaded into the end of a long tube on the deck over the pool. The tube is inserted into the pool and the split pin engaged with the blade with its tines straddling the blade. The tube is then unthreaded from the split pin and removed. The new nut has already been positioned on the upper counterbore and rests on the annular base of this counterbore. The pin-insertion/torquing tool now performs the following operations:

1. The blade and, with it, the engaged split pin is oriented with its tines at either 0° or 90° depending on what end of the hydraulic cylinder which controls the blade is pressurized. This allows for the two split pins of the LGT being processed to be inserted perpendicularly to each other.

2. The pin-insertion/torque tool is moved along a set of rails by a hydraulic cylinder from its storage position toward the LGT. A preset stop positions the tool so that the split pin is precisely located under the hole in the LGT flange coaxial with the hole and the counterbore, and the wrench is above the nut.

3. Actuation of another hydraulic cylinder raises the blade (and, with it, the split pin) upwardly through the LGT hole and through the nut to the level where the nut contacts the pin threads. An arm which is above the wrench provides a stop to prevent the nut from being pushed out of the counterbore when the pin threads contact the nut threads.

4. Actuation of another hydraulic cylinder lowers the wrench onto the nut. Spline engagement may or may not occur during this step.

5. Actuation of yet another hydraulic cylinder rotates the wrench. A preset stop limits this rotation to 36° (one-tenth of a turn). Engagement of the splines will occur during this step if it had not occurred previously.

6. The wrench is lifted from the nut (reverse of Step 4).

7. The wrench is rotated back 36° (reverse of Step 5).

8. Steps 4, 5, 6, and 7 are repeatedly cycled. Since the nut is held down by the hold-down arm, as the nut threads to the pin, the pin is drawn upwardly allowing the flange of the pin to enter and seat in the lower counterbore of the LGT flange. When seating occurs, the wrench stalls due to a preset pressure limit. Since the pressure on the pin insertion cylinder (Step 3) is maintained during the cycling, the leaves of the pin are kept engaged to the blade of the loading tube and keep the pin properly oriented.

9. After the wrench first stalls, the pressure on the torquing hydraulic cylinder is increased to a precisely controlled higher pressure preset to a maximum magnitude. Under the higher pressure the nut is locked against the base of the upper counterbore. By controlling this higher pressure the proper torque load, which will preclude damage to the nut, or split pin, is achieved.

10. After the nut is fully torqued, the wrench is raised and rotated back to its starting position (Steps 6 and 7).

11. The blade is lowered (reverse of Step 3).

12. The pin-insertion/torque tool is returned to the storage position (reverse of Step 2). As the tool nears the storage location both the wrench and the arm used to hold the nut in the counterbore engage stops which swing them out from above the blade. This is necessary to allow loading of the next pin. Both the wrench and arm motions are resisted by springs which subsequently swing them back in place when the tool is moved back in toward the LGT.

The pin-insertion/torque tool according to this invention has the following advantages:

1. By changing, i.e., reversing, the sequence of operation, the tool can be used to either torque or untorque the nut.

2. The system is capable of being operated manually or, when coupled with a programmable computer, automatically.

3. When operated in a manual mode, the tool can correct abnormalities which may arise during the course of operation.

4. The tool is capable of being aligned where it is to be used and then inserted in the pool.

5. The tool is capable of operating in the confining region imposed by the mousehole in the side of the LGT.

6. Because both the nut and wrench are splined, sufficient gripping between them can be attained to obtain the high torque magnitudes necessary even though the gripping area is limited (180°) by the interference of the "mousehole".

7. The tool can be operated by remote control when submerged in borated water from the deck above the pool (see Calfo).

8. The tool is composed of stainless steel and is not corroded by the borated water.

BRIEF DESCRIPTION OF THE DRAWINGS

For a better understanding of the invention, both as to its organization and as to its method of operation, together with additional objects and advantages thereof, reference is made to the following description, taken in connection with the accompanying drawings, in which:

FIG. 2 is a view in side elevation of a new split pin;

FIG. 3 is a plan view of a new nut;

FIG. 4 is a view in longitudinal section taken along line IV—IV of FIG. 3; but also showing the body portion of the new split pin threaded into the nut and a fragment of the flange at the LGT;

FIG. 12 is a view in longitudinal section taken along line XII—XII of FIG. 10;

FIG. 13 is a view in longitudinal section taken along line XIV—XIV of FIG. 12;

FIG. 15 is a view in section taken along line XV—XV of FIG. 12;

FIG. 16 is a view in transverse section taken along line XVI—XVI of FIG. 10;

FIG. 17 is a view in transverse section taken along line XVII—XVII of FIG. 16.

FIGS. 6 and 7 are included for the purpose of aiding the understanding of the instant invention.

DETAILED DESCRIPTION OF THE EMBODIMENTS

Figure 1:
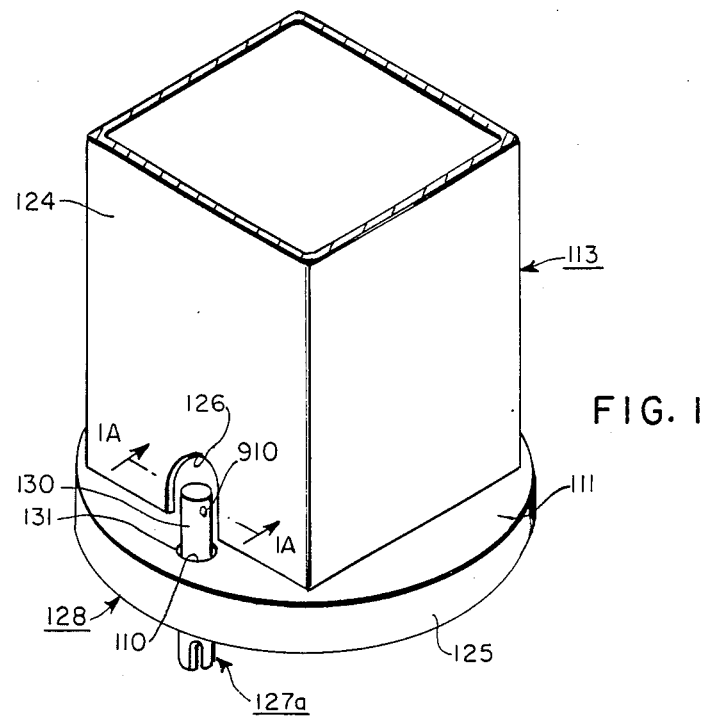
FIG. 1 is a fragmental view in isometric of an LGT whose split-pin assemblies are replaced in the practice of this invention.
Figure 1A:
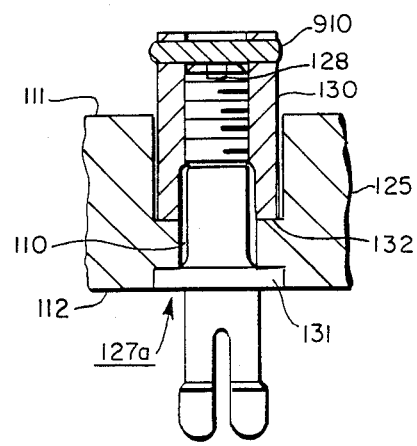
FIG. 1A is a view in section taken along line 1A—1A of FIG. 1; but with the split pin not sectioned.

FIG. 1 shows the bottom end of a lower guide tube 113 and FIG. 1A is a cross-sectional view of an old splitpin assembly mounted in the guide tube flange. The LGT is of generally square cross section having flat vertical walls 124. A circular flange 125 is welded to the lower end of the walls. Two 180° spaced-through holes 110, counterbored on both the top 111 and bottom 112, are provided in the flange 125 for mounting the split-pin assemblies (only one is shown in FIG. 1). Directly above each hole there is an opening 126 (referred to as a "mousehole" because of its shape) in the wall which allows room for installation of the nut 130 of each split-pin assembly. Since the nut is partially inside the "mousehole" 126, access to the nut is limited to the region external to the "mousehole". The mounting of the split-pin assembly on the flange 125 consists of inserting the pin 127a up through the hole. The nut 130 is then threaded onto the pin and torqued to firmly seat the pin flange 131 (FIG. 1A) and the end 132 of the nut on the shoulders formed in the respective counterbores in the flange 125. A button 128 is then inserted into a keyway on the top of the pin and a round bar 910 is inserted through holes spaced radially by 180° in the cap in order to lock the pin to the nut.

Figure 5:
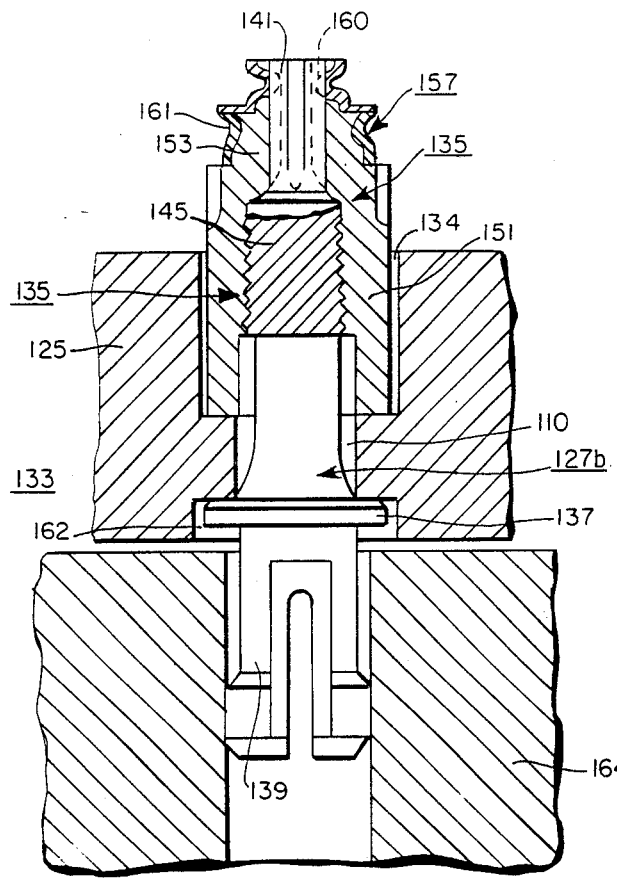
FIG. 5 is a view in longitudinal section showing a new split-pin assembly installed in an LGT with the lower part of the new split pin not sectioned.
Figure 7:
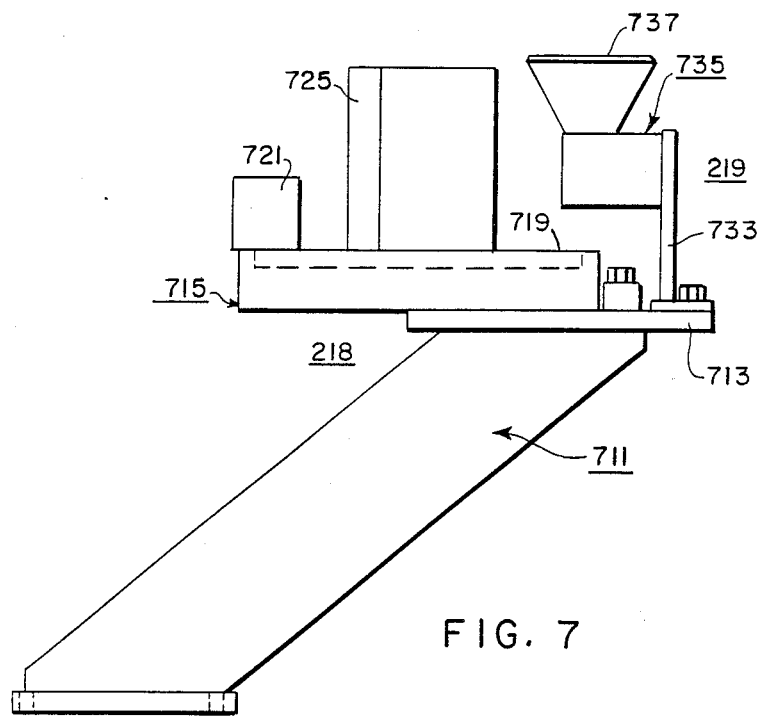
FIG. 7 is a view in side elevation taken in the direction VII—VII of FIG. 6.

The old split-pin assembly (FIGS. 1, 1A) is, in the practice of this invention, replaced by a new split-pin assembly 133 (FIG. 5). Like the old assembly the new assembly 133 (FIGS. 5, 7) includes a split pin 127b and a nut 135 (FIGS. 4, 5). The new split pin 127b (FIG. 5) has a flange 137. Tines or leaves 139 extend integrally from one face of this flange and a shank extends integrally from the opposite side. The shank terminates in a stem 141 having grooves or flutes 143 whose axial center liens are spaced peripherally by 90° so that there are four grooves in each stem 141. Between the stem and the flange 137, the shank has a threaded section 145.

The new nut 135 (FIGS. 3, 4) includes an annular central section 151 which has an internal thread dimensioned to mesh with the thread on section 145 of the split pin 127b. A skirt 152 extends from section 151 at one end and a collar 153 at the opposite end. Below the collar 153, the nut has splines 154 along a portion of its length. The collar 153 has a plurality of holes 155 in its surface. The center of the holes are spaced by 90° peripherally. A locking cap 157 is secured in the holes 155. The locking cap 157 has a pedestal 159 from which a tubular portion 160 extends. The locking cap is positioned over the collar 153 with the lower surface of the top of the pedestal 159 in engagement with the top of the collar. The peripheral surface of the pedestal is crimped at positions outwardly of the holes 155. The crimped surfaces 161 have the shape of frustum of a cone and are reentrant into the holes 155. The crimping is such that the pedestal 159 grips the collar tightly so as to preclude rotation of the locking cap 157 relative to the collar 153 even if very high torques are impressed between the body of the nut 135 and the locking cap 157. FIGS. 3 and 4 show the nut 135 as it is fabricated.

FIG. 5 shows a new split-pin assembly 133 as it is secured in the flange 125. The nut 135 is seated in the upper counterbore 134 and the flange 137 of the split pin 127b extends into the lower counterbore 162. The tines 139 of the split-pin 127b resiliently engage the wall of a hole in the upper core plate 164 of the reactor. The tubular part 160 of the locking cap 157 is crimped in grooves 143 of the stem 141 of the new split pin 127b. The part 160 is crimped into only two opposite grooves 143 of each new split pin. For one split pin the part 160 is crimped into grooves generally coextensive with the apexes of the tine surfaces; in the other case the part is crimped into grooves centered along the center plane between the tines 139.

Figure 6:
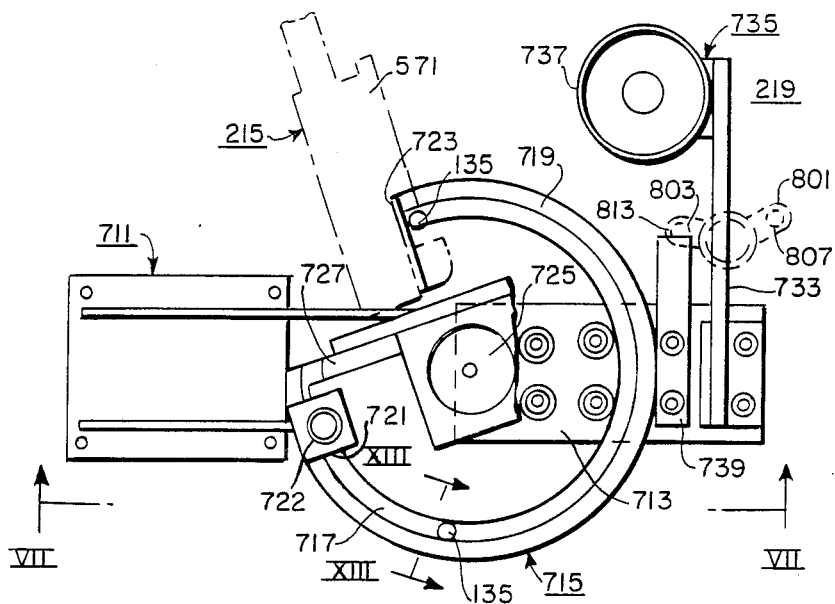
FIG. 6 is a plan view showing predominantly the nut hopper but also showing its position in relationship to the pin-insertion/torque tool.

FIG. 6 shows the new-nut hopper 218 in horizontal position as it would appear from above the pool. The nut hopper 218 is supported at an elevation where each new nut 135 (FIGS. 3, 4) is in position to be removed from the hopper 218 by the pick-and-put tool 215, by a bracket 711 (FIGS. 6, 9) which extends from the bracket 712 (FIG. 9) that supports the pin-insertion/torque tool 219. FIG. 6 shows in broken lines the arm 571 of the clamp of the pick-and-put tool. The elevation of the nut hopper is also such that the new nut, when removed by the pick-and-put tool is properly positioned for insertion in the counterbore 134 (FIGS. 1, 5) of the flange 125 of the LGT. The bracket 711 carries a horizontal plate 713 at the top from which a horizontal circular plate 715 is supported. This plate extends over an angle of about 270° and has a grooved annulus 717, which may be described as a nut magazine. New nuts 135 are arrayed in the annulus. The nuts 135 in the groove 717 extend above the upper rim 719 (FIG. 6) of the groove so that they may be engaged by jaws of the pick-and-put tool. Near an end the magazine 717 has a loading port 721. The loading port 721 has a funnel 722 (FIG. 6) to facilitate loading of nuts 135, one by one, in the magazine from above the pool through a long tube (not shown). At the opposite end the magazine 717 has a stop 723 which defines an unloading port. At this end each nut which abuts the stop 723 is in position to be removed by the pick-and-put tool 215. A rotary hydraulic cylinder 725 is supported from plate 713. This rotary cylinder 725 carries an arm 727 which when actuated by the cylinder advances nuts arrayed in the magazine 717 counterclockwise, as viewed with respect to FIG. 6, towards the stop 723 so that each nut in the array, in its turn, is in position to be removed by the pick-and-put tool 215. Typically about 24 nuts can be arrayed along the magazine 717.

Figure 9:
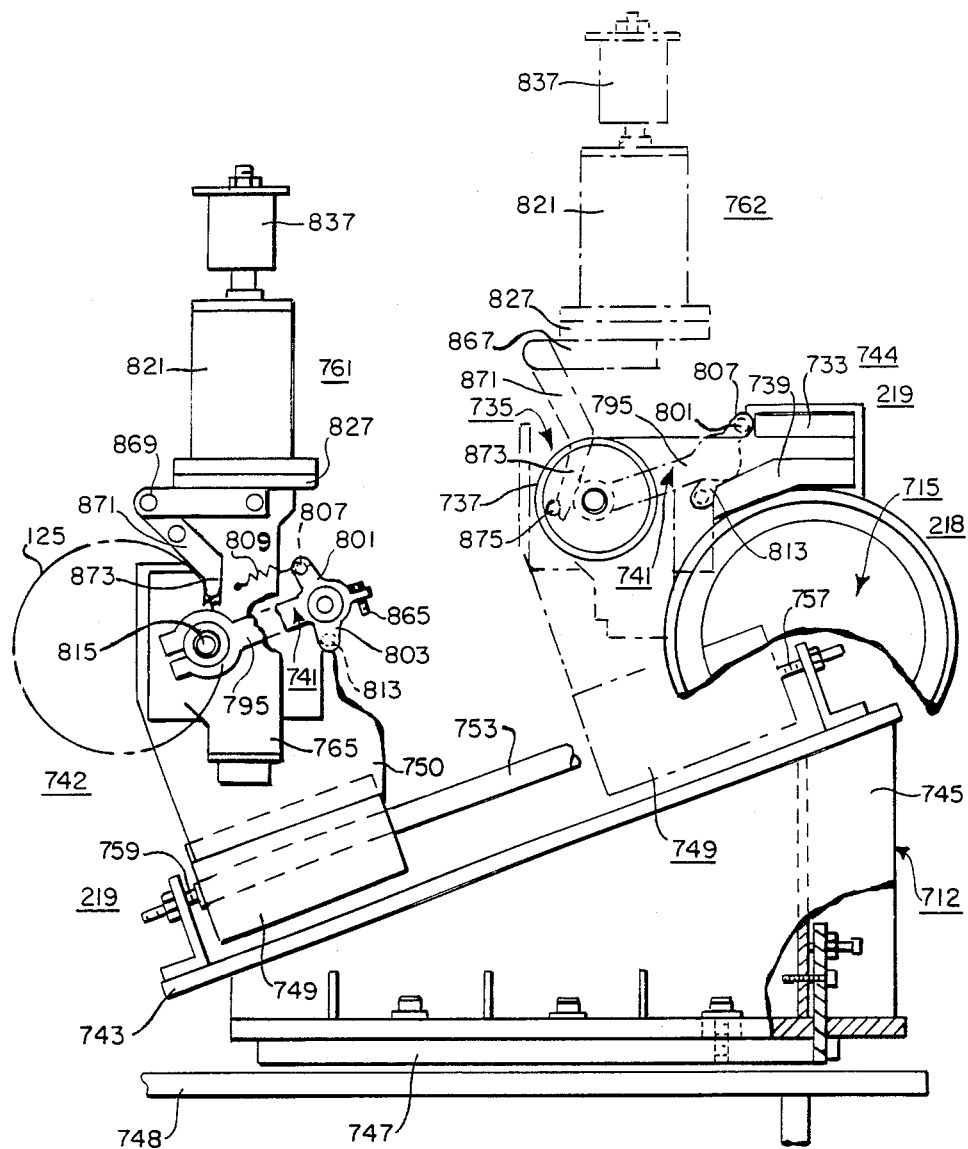
FIG. 9 is a plan view showing the pin-insertion/torque tool predominantly in broken lines in the storage or "home" position where the pin is placed on the blade and, predominantly in full lines in the position where the nut is threaded onto the pin.

The plate 713 extends beyond the circular plate 715 on the side opposite to the loading port 721. This plate carries a supporting plate 733 for the split-pin loading guide 735 of the pin-insertion/torque tool 219 and its funnel 737 (FIG. 9). The plate 713 also carries stop 739 for the wrench 741 of the pin-insertion/torque tool.

Figure 8:
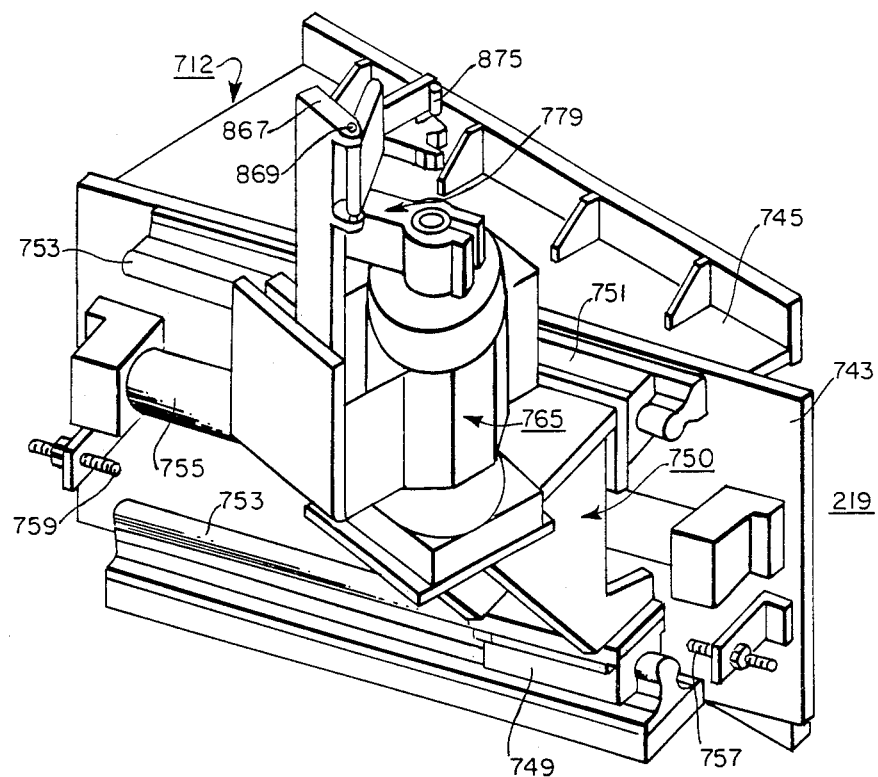
FIG. 8 is a simplified view in isometric with parts omitted in the interest of clarification, showing the pin-insertion/torque tool according to this invention.

FIG. 9 shows the hopper and pin-insertion/torque tool as they would appear if viewed from a point directly over them above the pool, i.e., as they would appear if their outlines were projected on a horizontal plane. The components of the pin-insertion/torque tool 219, aside from the funnel 737, are mounted moveably on a vertical base plate 743 (FIG. 8). The base plate 743 is suspended from the edge of a horizontal trapezoidal-shaped plate 745 of the angle bracket 712 (FIGS. 8, 9). The angle bracket 712 is mounted on a cluster plate 747 which is in turn suspended from strong back 748 (FIG. 9). The actuating components of the pin-insertion/torque tool are mounted on a carriage 750 which is moveable on slides or pillow blocks 749 and 751 (FIG. 8) that are slideable horizontally on tracks 753 by transport cylinder 755 (FIG. 8). Stops 757 and 759 are provided; these stops engage the pillow blocks 749 and 751 to limit the advance movement and the retract movement respectively of the components. In the advanced position 761 (FIG. 9), the wrench 741 is set to thread the nut 135 onto the threaded section 145 of the new split pin 127b (FIGS. 2, 3, 4, 10). In the storage position 762, the new pin 127b is loaded into the pin-insertion/torque tool 219.

Figure 10:
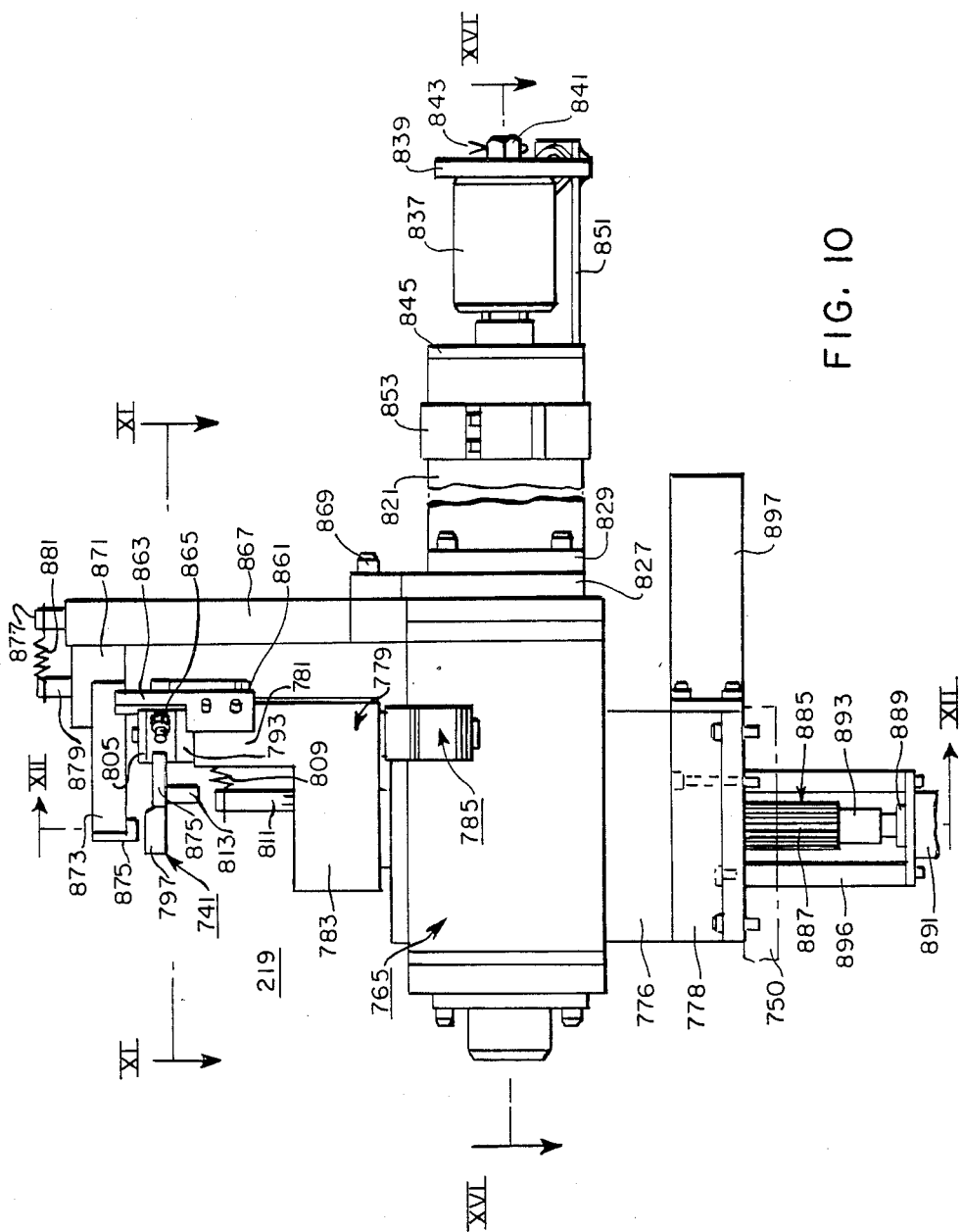
FIG. 10 is a plan view of the pin-insertion/torque tool.
Figure 11:
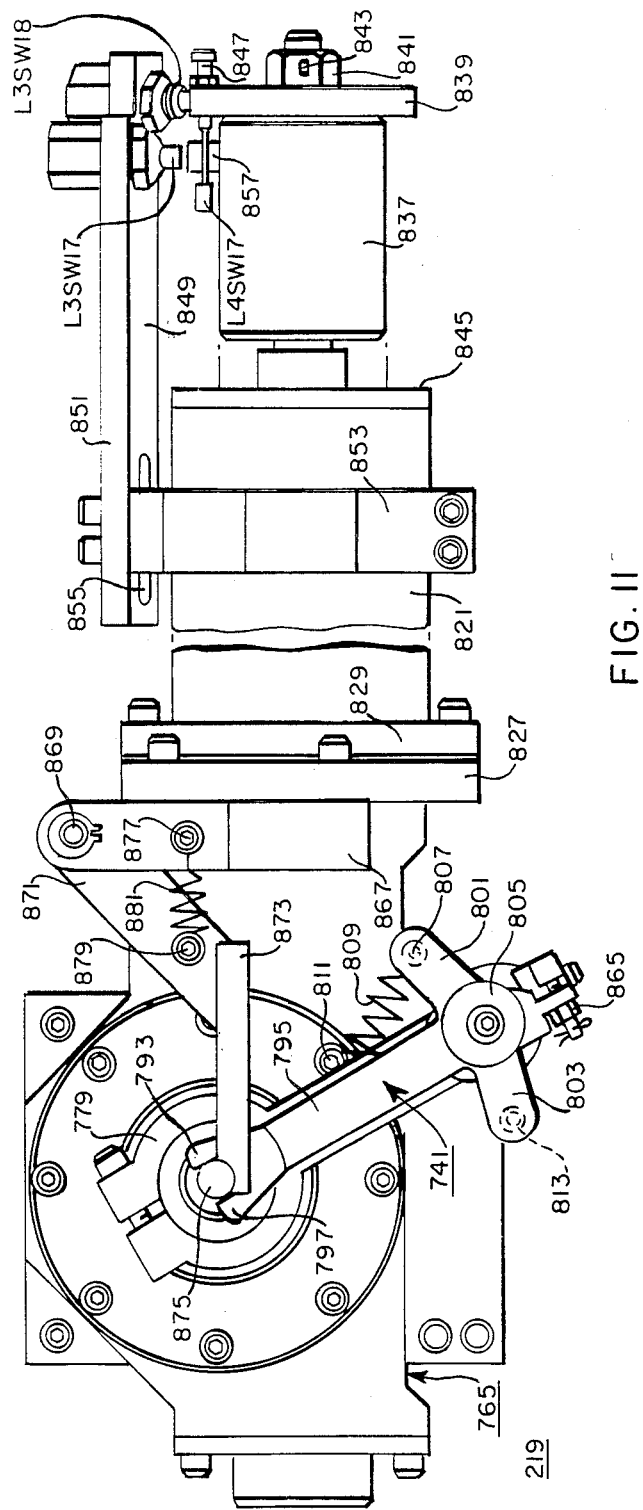
FIG. 11 is a view in side elevation taken in the direction XI—XI of FIG. 10.

The pin-insertion/torque tool 219 (FIGS. 10, 17) includes a housing 765. Internally, the fixed races 769 of ball bearings 771 are supported on the wall of the housing 765 (FIG. 12). The rotating races 773 are carried by a hollow shaft 775. The bearings 771 are held axially by a bearing retainer 776 bolted to housing 765. The bearing retainer 776 is mounted on an adapter 778 bolted to carriage 750. A pinion 777 (FIGS. 10, 16) is mounted rotatable with the shaft 775. The shaft is shouldered at its outer end and a wrench arm 779 (FIGS. 10, 12) is clamped to the shouldered end. The wrench arm has a hollow extension 781 at right angles to its arm 783 which is clamped to the shaft 775. A lift cylinder 785 is mounted at one end of the opening in the hollow member 781 by a threaded sleeve 787 (FIG. 14). The piston rod 789 of the cylinder is threaded into the end of an actuating rod 791 which is slideable in the opening of the member 781. At the opposite end a bushing 793 is secured to the rod 791. The wrench 741 (FIG. 11) includes an arm 795 having a splined head 797 at one end and a supporting eyelet 799 at the opposite end. At the eyelet end arms 801 and 803 extend laterally from the wrench (FIG. 11). The wrench is pivotally supported on the stem of bushing 793 (FIG. 14) between the flange of the bushing and a retainer 805 which is bolted to the end of actuating rod 791. When the cylinder 785 is actuated, the actuating rod 791, the bushing 793, the wrench 741 and the retainer 805 are raised to clear a nut 135 which is being torqued and to enable the wrench to be reset for a succeeding torquing operation.

Figure 18:
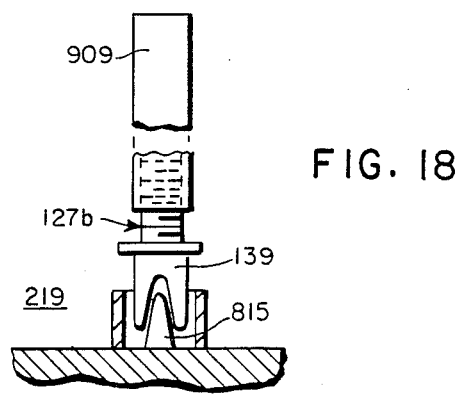
FIG. 18 is a diagrammatic view showing how a new split pin is transferred to the pin-insertion/torque tool.

The arm 801 carries a pin 807 (FIG. 11). A spring 809 extends between pin 807 and a pin 811 extending from the clamped leg 783 of the wrench arm 779 (FIG. 12). The spring 809 centers the wrench 741 with its head 797 over the position where the nut 135 is to be inserted in counterbore 134 of the flange 125 of the LGT 113 (FIGS. 1, 5); i.e., coaxial with the shaft 775. The arm 803 also carries a pin 813. When the pin-insertion/torque tool 219 is in storage position 762 (FIG. 9), the pin 813 is engaged by the end of stop 739 and the wrench 741 is pivoted away from its center position against the action of the spring 809 so that a new pin 127b may be positioned on blade 815 (FIGS. 6, 12, 18). When the pin-insertion/ torque tool is removed from position 762 (FIG. 9) the wrench head 793 is returned to the torquing position by spring 809.

The pinion 777 is rotated back and forth over a predetermined angle, typically 36°, by a rack 817 (FIGS. 12, 16). The rack 817 is reciprocated on ball bushings 819 by a cylinder 821 whose piston rod 823 is connected to a spring pin 825 which is threaded into one end of the rack (FIG. 16). An annular cylinder adapter 827 is bolted to the housing 765 (FIGS. 10, 16). The pedestal 829 of the cylinder 821 is bolted to the adapter 827. The piston rod 823 slides in a bushing 831 in the pedestal. The piston (not shown) of the cylinder 821 is double ended having a piston rod which extends from the end opposite to the rod 823. This opposite rod has an extension 833 (FIG. 16) which is connected through a threaded pin 835 with a cylindrical stop 837 of generally C-longitudinal cross section and to a target 839. A nut 841 is secured to the pin 835 by a cotter pin 843. By rotating the nut 841 in one direction or the opposite direction, the stop 837 may be set to the right or to the left with reference to FIG. 16. On the forward movement of the piston and of the rack 817 the forward end of stop 837 contacts the top 845 of cylinder 821, limiting the forward movement of the rack and the angle over which the pinion 777 is rotated. The forward movement is the movement towards the left-hand (nearest) end of housing 765 with reference to FIG. 16. (Produces clockwise rotation of pinion 777.) The piston (not shown) of the cylinder 821 moves at a relatively low speed so that no damage occurs by reason of the contact of the stop 837 and the top 845 of the cylinder. By setting the position of the stop precisely, the angle over which the pinion 777 rotates may be precisely set. The target 839 carries a magnet 847. This magnet actuates switch L3SW16 in the most outward position of the piston rod extension 833 and switch L3SW17 in the most inward position of the extension. Switches L3SW16 and L3SW17 are carried on bars 849 and 851 which are bolted to a clamp 853 secured to cylinder 821. Bar 849 has a longitudinal slot 855 so that the bar can be slid inwardly or outwardly to align magnet 847 with switch L3SW16 in the most outward position of the extension 833. To achieve better precision than can be achieved by proximity switch L3SW17, a microswitch L4SW17 is provided. This switch is actuably by a stud 857 on stop 837 in the most inward position of the rack 817.

When the pin-insertion/torque tool 219 is in use in torquing or untorquing a nut 135, the splined head 797 is positioned coaxial with the shaft 775 (FIG. 12). The translational movement of the rack 817 in one direction or the opposite direction, rotates the wrench about the axis 859 of the shaft 775. A stop 861 is suspended from the end of right-angle extension 781 of wrench arm 779 (FIG. 10, 12). The stop 861 has an extension 863 which overhangs the end of extension 781 and is engaged by a set screw 865 on the end of the wrench 741. The stop 861 maintains the wrench head 797 centered on the axis of the shaft 775 preventing the spring 809 from pulling the wrench head 797 off the axial position.

The cylinder adapter 827 carries a pivot arm 867 on its surface opposite the pedestal 829 (FIGS. 10, 11). The pivot arm 867 carries a pivot pin 869 (FIGS. 11, 13) at its end overhanging the adapter 827. The pin 869 pivotally supports a linkage 871 which carries a stop arm 873. The stop arm carries a hold-down pin 875 at its end (FIGS. 8, 10, 11). The pivot arm 867 carries a spring pin 877 intermediate its ends and the linkage 871 carries a pin 879 intermediate its ends. A spring 881 is connected to the pins 877 and 879. In the normal use of the pin-insertion/torque tool 219, the spring 881 positions the hold-down pin 875 coaxially with the shaft 775 and the head 797 of the wrench 741. The pin 875 holds down a nut 135 while it is being torqued. When the nut is being untorqued, the pin 875 holds down the nut 135 so that the untorquing releases the pin 127b. When the pin-insertion/torque tool 219 is set in the pin-loading (storage) position 762 (FIG. 9), the stop arm 873 engages the funnel 737 so that the pin 875 is removed from the position over the blade 815 (FIG. 12) and a new pin 127b may be mounted on the blade.

The blade 815, on which the new split pin 127b is mounted, is seated in, and pinned to, a bushing 883 at the end of a rod 885 which is splined at the end 887 (FIGS. 10, 12, 18). The rod 885 is connected at the splined end to the piston rod 889 of a cylinder 891 through an adapter or coupling 893 and a spring pin 895

(FIG. 12). The cylinder 891 is supported on a bracket 896 connected to adapter 778. The piston 891 is actuable to advance rod 885 and a new pin 127b mounted on (straddling) it into the lower counterbore 162 of an LGT into engagement with a new nut 135.

It is necessary that the tines 139 of the two split pins 127b which are inserted in an LGT 113 be oriented at 90° with reference to each other. This orientation is achieved by cylinder 897 (FIG. 10). Cylinder 897 is mounted on adapter 778. Its piston rod 899 (FIG. 12) penetrates slideably through the adapter and engages a cam block 901 moveable within a groove within the adapter (FIGS. 12, 15). The cam block 901 has a groove in which it engages a cam follower or roller 903 (FIG. 15). The roller 903 is connected to a rotary actuator 905 splined to rod 885 and rotatable on bushing 907 (FIG. 12). Movement of the piston rod 899 from its neutral position in either direction turns the rod 885 and a pin 127b connected to it by 45° in one direction or the other thus orienting one pin 127b at 90° to the second pin.

In installing a new split pin 127b on the blade 815, the new pin is initially threaded onto the end of a long tube 909 (FIG. 18). The pin-insertion/torque tool 219 is moved to storage position 762 (FIG. 9) where the stop 739 exposes the blade 815. The tube 809 is then manipulated so that the tines 139 of the split pin which it carries straddle the blade 815. The tube 809 is then unscrewed and removed and the tool 219 carrying the new split pin 127b is returned to its processing (advanced) position 761.

The split pin 127b on blade 815 may now be secured in the flange 125. The split pin is appropriately oriented by actuating cylinder 897 in one direction or the other. Earlier the nut 135 was deposited in the upper counterbore 134 (FIG. 5) by the pick-and-put tool 217 as disclosed in parent patent 4,730,388. Cylinder 891 (FIGS. 10, 12) is actuated to advance the shank of the new split pin 127b through the hole 110 in the flange 125 into threading contact with the nut. Ejection of the nut is prevented by pin 875 (FIGS. 8, 11). With the wrench 741 set in advanced position from (above) the nut 135 by cylinder 785, the wrench is set in the angular position to thread the nut 135 onto the split pin by cylinder 821. The wrench 741 is now retracted by cylinder 785 to a position in which its splines are set to engage or disengage the splines on the nut. Cylinder 821 is now actuated to turn the wrench so that the nut 135 is threaded onto pin 127b over the angle of turn of the wrench, typically 36°. During the first turn, the splines on the wrench engage the splines on the nut if they are not initially engaged. Cylinder 785 is now actuated to cause the wrench 741 to disengage the nut and be advanced away vertically from the nut. The wrench is reset by cylinder 821 and the above threading operation is repeated. The threading continues until the nut seats on the base of the counterbore 134 and the wrench stalls.

Limit switch L3SW18 is actuated on each stroke of wrench 741. On each actuation of L3SW18, a relay (not shown) is actuated (see Calfo). As disclosed in Calfo the apparatus includes a counter and a display for displaying counts. The counter and display are actuated on each actuation of the relay. Typically about 70 strokes of the wrench 741 are required to seat the nut 135 properly in the counterbore 134 on low torque. If the wrench is stalled before the appropriate number of counts is displayed, a maloperation has occurred and the new nut 135 must be untorqued, the new nut and new pin 127b must be discarded and the operation must be repeated. The strokes of the wrench can also be counted by the computer. However, the separate counter has the advantage that it is available even if the operation is manual or the computer is disabled. After the stall is reached, the wrench 741 is reset and precisely determined high torque is applied to tighten the nut 135. The high torque is applied by cylinder 821 through the rack 817 and pinion 777. The high torque is derived through a valve from a high pressure line whose pressure is precisely determined.

Typically the nut 135 has 10 splines uniformly spaced at 36° between adjacent splines around its periphery. During the initial threading running operation, the nut and wrench mutually adjust themselves so that the splines of the wrench enter the grooves between the splines of the nut. During the first and each subsequent operation, the wrench is turned over a precisely determined angle, typically 36° so that the splines of the wrench 741, as it is lowered, precisely engage the grooves between the splines in the nut 135. The wrench is turned and raised laterally of the wall of the LGT113 clearing the lip of the opening in the LGT above the nut 135. On each completion of the strokes of the wrench 741, limit switches L3SW18 and L3SW17 and/or L4SW17 (FIG. 11) are actuated. In addition, the cylinder 821 has a pressure switch (not shown) which closes when cylinder 821 has advanced the wrench to the end of its stroke. On each stroke which occurs before the wrench 741 is stalled on low torque, switches L3SW17 and/or L4SW17 close before the pressure switch. When the wrench stalls, it stalls before the end of the stroke. The pressure switch closes but limit switches L3SW17 and/or L4SW17 do not close or close after the pressure switch. The closing of the pressure switch and L3SW17 and/or L4SW17 each turns on a light. When the light for limit switches L3SW17 and/or L4SW17 turn on and the light for the pressure switch does not turn on or turns on after the light for the limit switches, the operator is informed that the wrench 741 has stalled on low torque (see Calfo).

The same signalling occurs on high torque. The high torque is applied by energizing a solenoid (not shown). When the pressure reaches the preset magnitude, a pressure switch closes. Before the wrench stalls on high torque limit switches L3SW17 and/or L4SW17 close before the latter pressure switch. When the wrench 741 stalls on the precise high torque, switches L3SW17 and/or L4SW17 close but the pressure switch either does not close at all or closes after the limit switches. Light signals are turned on corresponding to the operation of the switches (see Calfo).

It is essential that the nut 135 be secured so that it does not become separated or unthreaded from the pin. The old nut 130 (FIG. 1) which is threaded onto the old pin 127a is held by cross pin 910 which is welded to the nut at both ends. This structure is not feasible for the new pin 127b and nut 135 because the welding of the new nut cannot be carried out under water. The new pin 127b extends above the nut 135 (FIG. 5). The nut 135 as fabricated for threading to the pin has secured to it the locking cap 157 (FIG. 4) whose tubular section extends to the level of the stem 141 of the pin 127b. After the nut is threaded onto the pin 127b, the locking cap is securely crimped in opposite grooves 143 in the pin preventing unthreading of the nut from the pin.

While a preferred embodiment of this invention has been disclosed herein, many modifications thereof are feasible. This invention is not to be restricted except insofar as is necessitated by the spirit of the prior art.

We claim:

1. A pin-insertion/torque tool for the replacement of old split-pin assemblies of a guide tube of a nuclear reactor with new split-pin assemblies, each of said new split-pin assemblies including a new split-pin having tines and a new nut for securing said new split pin in said guide tube, a new nut being inserted in said guide tube in position to receive a split pin; the said pin-insertion/torque tool including a blade means for engaging a new split pin with said blade with the tines of said new split pins straddling said blade, means, connected to said blade, for advancing said split-pin into said guide tube into threading engagement with the new nut positioned to receive a new split pin and means, to be connected to said nut for securing said new nut onto said new split pin while said split pin is engaged by said blade.

2. The pin-insertion/torque tool of claim 1 for replacement of the old split-pin assemblies with new split-pin assemblies of a guide tube having at least two split-pin assemblies secured at spaced positions around its periphery, the tines of one of the split pin of one of said assemblies to be at an angle to the tines of the split-pin of the other of said assemblies, the said pin-insertion/torque tool being characterized by that it includes means, connected to the blade, for selectively rotating the blade through an angle to orient the new split pins of said one and said other of new split pin assemblies for securing them to said guide tube with the tines of one of said split pins at said angle, to the tines of the other of said split pins, whereby both new split-pin assemblies may be secured in said guide tube with a single pin-insertion/torque tool.

3. A pin-insertion/torque tool for the replacement of an old split-pin assembly with a new split-pin assembly in the lower flange of the guide tube of a nuclear reactor, said new split-pin assembly including a new split-pin and a nut, to be threaded onto said new split-pin, said new split-pin assembly to be secured into a counterbore of said lower flange of said guide tube; the said pin-insertion/torque tool including, means for positioning and holding a new split pin in a counterbore of said flange in engagement with a new nut with said new nut in position to be threaded onto said positioned and held split pin, means, connected to said positioning and holding means for advancing said positioned and held split pin into threading engagement with said nut, full access to thread said engaged new nut over 360° onto said positioned new split pin, providing normal turning space for a wrench, being obstructed by a wall of said guide tube extending above said counterbore where said engaged new nut is disposed, the said pin-insertion/torque tool also including a laterally open wrench, means, connected to said wrench, for mounting said wrench adjacent said engaged nut laterally of said wall, and means for actuating said wrench repeatedly (a) to engage said engaged new nut at an initial position while said engaged new nut is positioned to be threaded onto said positioned new split-pin, (b) to rotate said engaged new nut over a limited angle to an advanced position in threading engagement with said positioned new split pin, (c) to disengage said engaged new nut, and (d) to rotate back to the initial position, there being clearance between the trailing edge of said wrench and said wall of said guide tube in the initial position and between the leading edge of said wrench and said wall in the advanced position, said wrench to be repeatedly actuated as aforesaid until said engaged new nut is threaded onto said positioned new split pin and said positioned new split pin is locked against the base of said counterbore.

4. The pin-insertion/torque tool of claim 3 including hold-down means for holding down the engaged new nut while this nut is rotating in threading direction with respect to the positioned new split pin, whereby the positioned new split pin is drawn towards locking relationship with the base of the counterbore.

5. The pin-insertion/torque tool of claim 3 for replacement of an old split-pin assembly by a new split-pin assembly in the lower flange of the guide tube of a nuclear reactor, said lower flange, having communicating upper and lower counterbores, wherein the wrench actuating means actuates said wrench repeatedly through the steps (a), (b), (c), (d) to lock the positioned new split pin to the base of the lower counterbore and also to lock the engaged new nut to the base of the upper counterbore.

6. The pin-insertion/torque tool of claim 3 wherein the wrench-actuating means includes means for applying a low torque for repeatedly rotating the engaged new nut to the advanced position until the wrench is stalled by the engagement of said engaged new nut with the base of the upper counterbore and means for applying the high torque of predetermined magnitude to said engaged new nut after said wrench is so stalled for rotating said engaged new nut into locking engagement with said base of said upper counterbore, the magnitude of the high torque being sufficient to lock said engaged new nut to said base of said upper counterbore but not so high as to damage said engaged new nut or the positioned new split pin.

7. The pin-insertion/torque tool of claim 3 wherein the actuating means for the wrench includes means, connected to said wrench, for moving said wrench generally axially of the engaged new nut between a position in which it is in rotating engagement with said engaged new nut and a position in which it is disengaged from said engaged new nut and is in condition to be reset for a subsequent rotation of said engaged new nut.

8. The combination of a pin-insertion/torque tool for the replacement in the flange of a guide tube of a nuclear reactor of an old-split-pin assembly by a new split-pin assembly, and of positioning means for positioning said pin-insertion/torque tool in a first position and in a second position, said pin-insertion/torque tool including a wrench, said new split-pin assembly including a new split-pin and a new nut, the said guide tube being positioned, during the replacement process in said second position with a new nut in said flange; the said pin-insertion/torque tool including a blade, means for actuating said positioning means to set said pin-insertion/torque tool in said first position there to enable said blade to engage a new split-pin between the tines of said new split-pin, means for thereafter actuating said positioning means to position said pin-insertion/torque tool in said second position with said wrench disposed to be set into threading engagement with said nut, means, connected to said blade, for advancing said blade in said second position of said pin-insertion/torque tool to advance said new split-pin into threading engagement with said new nut, and means, connected to said wrench, for actuating said wrench to thread said new nut onto said new split pin.

9. The combination of a pin-insertion/torque tool for the replacement of an old split-pin assembly in the lower flange of the guide tube of a nuclear reactor by a new split-pin assembly, and of positioning means for positioning said said pin-insertion/torque tool in a first position and in a second position, said new split-pin assembly including a new split-pin and a new nut, the guide tube being positioned, during the replacement process, in said second position with a new nut in said flange; the said pin-insertion/torque tool including a blade and means for actuating said positioning means to set said pin-insertion/torque tool in said first position there to enable said blade to engage a new split pin between the tines of said new split-pin, said pin-insertion/torque tool also including a wrench having a head to engage a new nut for torquing said engaged new nut and also including means, mounting said blade and said head generally coaxially, said positioning means including means for advancing said pin-insertion/torque tool from said first position with said new split pin engaged with said blade to said second position with said flange interposed between said head of said wrench and said blade and with said last-named new nut in said flange generally coaxial with said blade and head, said pin-insertion/torque tool also including means, connected to said blade, for advancing said blade to advance said new split pin into threading engagement with said new nut and also including means, connected to said wrench, for actuating said wrench to torque said new nut in said flange onto said new split pin.

10. The combination of claim 9 for use in the replacement of an old split-pin assembly by a new split-pin assembly wherein access is obstructed by the wall of the guide tube to the top of the new nut in the flange of the guide tube positioned in the second position of the pininsertion/torque tool, the said combination being characterized by that the head of the pin-insertion/torque tool has a structure such that the head engages the new nut laterally during a torquing operation.

11. The combination of claim 9 wherein the actuating means for the wrench of the pin-insertion/torque tool includes means, connected to said wrench, for displacing the head of said wrench axially from the nut to reset said wrench for each new torquing operation.

12. The combination of claim 9 wherein the actuating means for the wrench of the pin-insertion/torque tool includes means, connected to said wrench, for rotating said wrench in one direction to carry out a torquing operation on said nut and in the opposite direction to reset said head for a succeeding torquing operation.

13. The combination of claim 9 wherein the pin-insertion/torque tool includes hold-down means for the new nut in the flange of the guide tube while it is being torqued by the wrench, said holddown means when enabled obstructing access to the blade, the combination being characterized by that it also includes means, actuable in the first position of said pin-insertion/torque tool, for disabling said hold-down means to permit access to the blade for engagement of the new split-pin by the blade.

14. The combination of claim 12 wherein the operation of the rotating means of the pin-insertion/torque tool is reversible, the wrench being rotatable in the direction opposite to the one direction in contact with the new nut in the flange to untorque said new nut and being rotatable in said one direction to be reset for a succeeding untorquing operation.

15. The combination of claim 12 wherein the rotating means of the pin-insertion/torque tool includes a pinion connected to the wrench, a rack in driving engagement with the pinion and means for reciprocating said rack.

* * * * *